Aug. 1, 1961
O. FRENZL
2,994,218
APPARATUS FOR CHECKING THE FLOW AREAS OF
NOZZLES, DISTRIBUTOR WHEELS OR THE LIKE
Filed Dec. 13, 1955
2 Sheets-Sheet 1
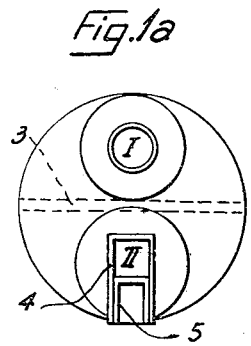
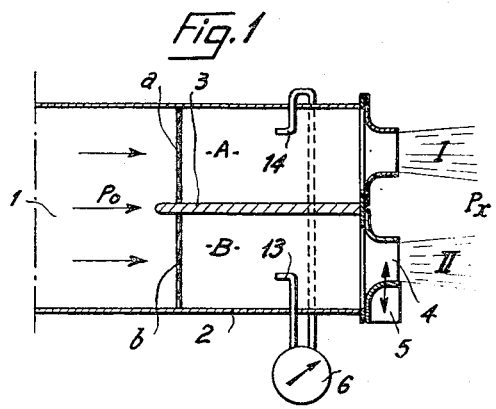
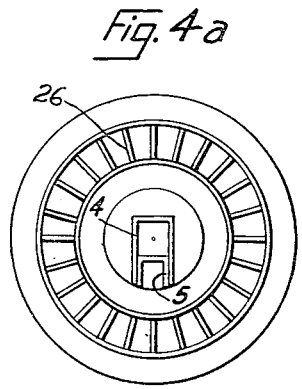
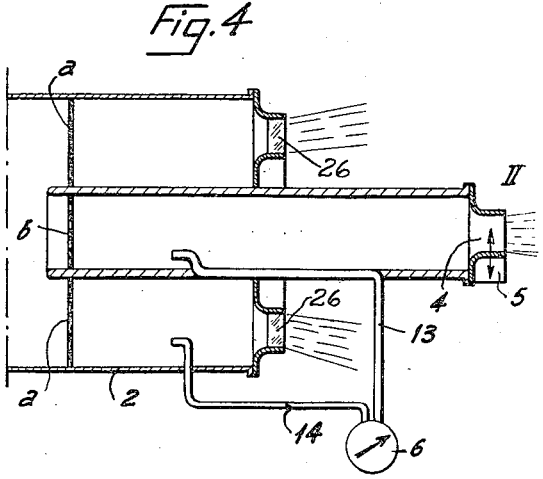
INVENTOR
OTTO FRENZL
By
Watson, Cole, Grindle & Watson
ATTORNEYS Aug. 1, 1961 O. FRENZL 2,994,218
APPARATUS FOR CHECKING THE FLOW AREAS OF
NOZZLES, DISTRIBUTOR WHEELS OR THE LIKE
Filed Dec. 13, 1955 2 Sheets-Sheet 2
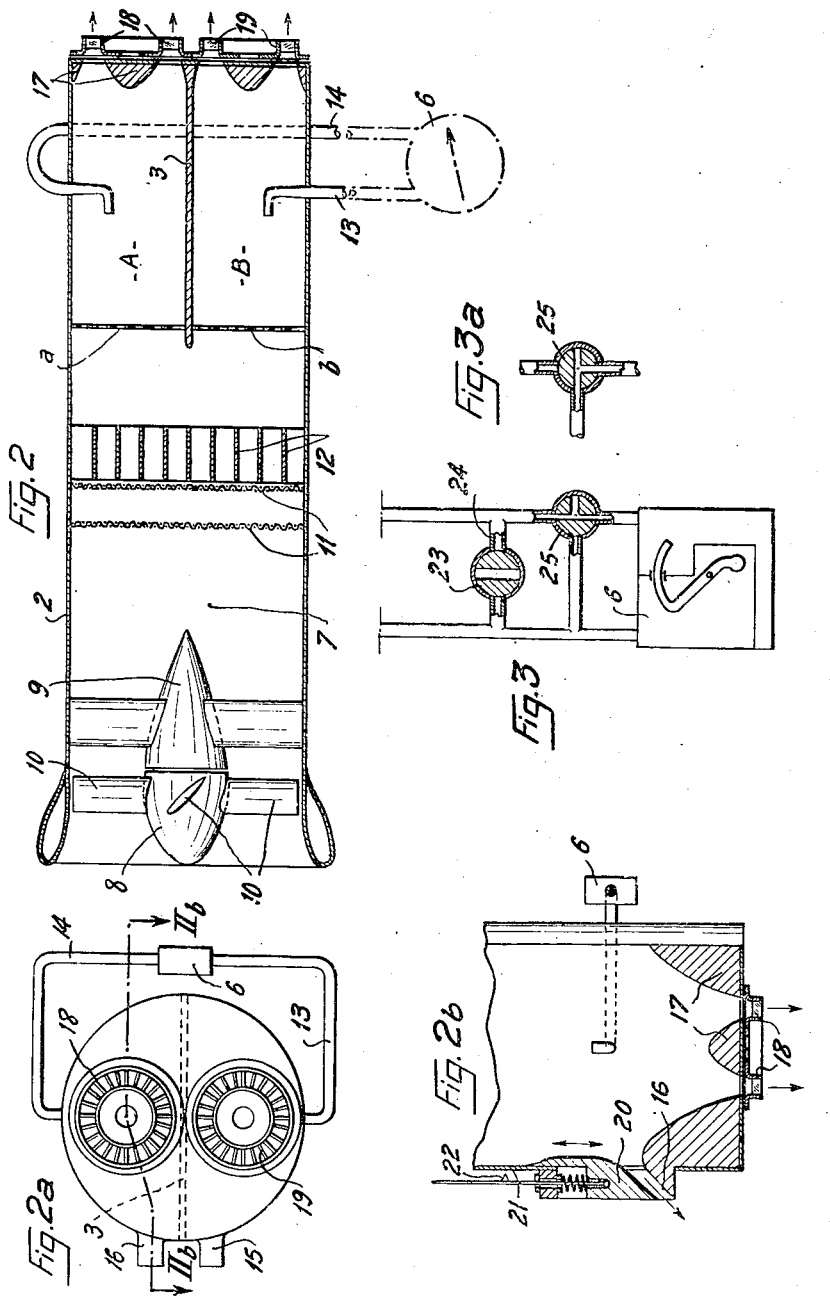
INVENTOR
OTTO FRENZL
By Watson, Cole, Grindle & Watson
ATTORNEYS

United States Patent Office 2,994,218
Patented Aug. 1, 1961

2,994,218
APPARATUS FOR CHECKING THE FLOW AREAS OF NOZZLES, DISTRIBUTOR WHEELS OR THE LIKE
Otto Frenzl, Cite Snecma, Pavillon 41, 11 Ave. Marechal Foch, Dammarie-les-Lys, France
Filed Dec. 13, 1955, Ser. No. 552,928
Claims priority, application France Dec. 17, 1954
6 Claims. (Cl. 73—37.5)

In order to avoid the considerable loss of time involved in the geometric measurement of the cross section of discharge nozzles and distributor wheels of turbines, etc. which are made by mass production and the shapes of which are often complex, the use of aerodynamic methods of measurement has been proposed.

If certain conditions are fulfilled, for example if the surfaces have an adequate and comparable polish, if the smallest cross section is actually at the outlet of the members, (in the case of distributor wheels for example) the value of the cross section can be calculated by measuring the quantity of air delivered, its density and its loss in pressure.

Experience has shown however that the errors of this method are too great to permit of picking out with certainty the pieces having inadmissible variations in cross section, that is to say those which exceed the usual tolerance of $\pm 1\%$ with respect to the theoretical cross section.

The errors of the said aerodynamic measurements are of the order of 2%, whilst a minimum accuracy of $\pm 0.2\%$ would be necessary to eliminate the pieces having defects reaching $\pm 0.8\%$ and to be sure of remaining within the limits of the tolerance of $\pm 1\%$ which is imposed.

The present invention enables the checking of the cross sections to be effected at least with the above accuracy, by measuring, not the absolute cross section of passage, but by determining the difference in cross section of the piece to be checked with respect to a standard member which has been accurately formed geometrically.

As the mass-flow is a function of the cross section expressed by the relation:

$$\text{Cross section} = \frac{\text{mass-flow}}{\text{speed at the outlet} \times \text{Specific weight}}$$

the present invention also serves to carry out more accurate measurements of the differences in flow through the piece to be checked with respect to a standard piece subjected to the same conditions of flow as those on the upstream and on the downstream sides of the piece.

By cross section, there is meant in this case, a supposed cross section of the flow, obtained by dividing the rate of flow by the speed at the outlet, which is obtained by calculation based on the pressure drop and the density. This section may be smaller than the geometric cross-section of the outlet, for example as a result of a constriction of the jet, and its determination is, in very many cases, more important than that of the geometric cross-section of the outlet.

A homogeneous flow of gas is divided into two parts which are respectively directed towards a regulatable passage and towards a passage in which the standard piece and the piece to be checked are placed in succession, the difference in the cross sections between the standard piece and the piece to be checked being deduced from the variation of cross section which must be given to the regulatable passage in order to restore equality of the total pressures on the upstream side of the two passages, when the standard piece has been replaced by the piece to be checked.

The invention also includes in its scope the device for carrying this method into effect, this device comprising means for effecting the homogeneous ducted flow and for dividing it into two branches, the entries of which are provided with "resistances" having equal drag (perforated sheets of steel for example) the outlet of one of the said branches being adapted to receive the standard piece and then the piece to be checked, whilst the outlet of the other branch has a cross section which can be regulated, means being further provided to indicate the difference in the total pressures between the two branches.

As can be seen, the invention derives its idea from the principle of the double weighing system, and has some resemblance to the Wheatstone electric bridge, totally different means being, however, employed.

The degree of precision which is attained amply satisfies the tolerances referred to above.

The description which follows below with regard to the attached drawings (which are given by way of example only and not in any sense by way of limitation) will make it quite clear how the invention may be carried into effect, the special features which are brought out, either in the text or in the drawings, being understood to form a part of the said invention.

FIGS. 1 and 1a show in longitudinal cross section and in end view, an embodiment of the principle of the device in accordance with the invention.

FIGS. 2 and 2a show similar views of a further form of embodiment.

FIG. 2b is a cross section taken along the line $II_b$—$II_b$ of FIG. 2a.

FIGS. 3 and 3a show two different positions of a valve system with three channels disposed on the upstream side of the manometer or pressure gauge shown in FIG. 2.

FIGS. 4 and 4a show an alternative form of the device in accordance with the invention, quite specially adapted to the checking of the outlet cross section of the distributor wheels of turbines.

In the device shown diagrammatically in FIGS. 1 and 1a, a homogeneous flow 1, coming from the left and produced for example by a wind tunnel, is channelled by the solid wall 2 and divided into two parts or branches A and B, by a central wall 3.

At the entry of each of the half-channels or branches thus formed are placed two members $a$ and $b$ which offer a resistance to the flow and are constituted by bodies having drag with respect to the regularity and the homogeneity of the flow (perforated steel sheets or grids, for example) whilst at the outlets of the half-channels are arranged other "resistances" constituted by the pieces I and II to be compared, which are shown in the drawings in the form of simple discharge nozzles, for the sake of simplicity.

The discharge nozzle I is fixed and the discharge nozzle II is variable. In order to facilitate the precise determination of its cross section of passage, the discharge nozzle II has a rectangular section 4, of which one side 5 is movable, and is provided with a graduation (not shown) giving the area of the opening. A differential sensitive pressure gauge 6 with a zero indication, enables the existence to be determined of a difference in the total pressures obtaining respectively in A and B, this pressure gauge being connected thereto by Pitot tubes 13, 14.

The four resistances, $a$, $b$, I, II, thus defined constitute a kind of aerodynamic bridge in the flow which will be balanced when the total pressures $P_A$ and $P_B$ in the half-channels A and B are equal, provided that:

(1) The total pressures on the upstream side of the two resistances $a$, $b$, have the same value $(P_0)$;

(2) And that the total pressures at infinity on the downstream side of the resistances I and II also have the same value ($P_x$). These conditions can readily be satisfied.

In practice, in accordance with the invention, the checking of the cross section of passage of a discharge nozzle is carried out as follows:

First of all, it is ascertained that the air-supply conditions on the upstream side of the channels A and B are stable; there is then mounted at I a calibrated discharge nozzle, the outlet cross section of which, $S_I$ is known, $S_a$ and $S_b$ corresponding to the openings of the resistances $a$ and $b$, and $S_{II}$ corresponding to the variable cross section of the discharge nozzle for the zero position of the pressure gauge 6. Apart from the constant, the following relation will apply:

$$\frac{S_a}{S_b} = \frac{S_I}{S_{II}}$$

If the discharge nozzle I is then replaced by the "unknown" discharge nozzle to be checked, after again balancing the pressures obtained by a modification $\Delta S_{II}$ of the cross section of the variable discharge nozzle II, the value $\Delta S_I$ can be obtained which represents the difference in cross section of the "unknown" discharge nozzle and of the calibrated nozzle I, as follows:

$$\Delta S_I = \frac{S_I}{S_{II}} \cdot \Delta S_{II}$$

in which $S_I$, $S_{II}$ and $\Delta S_{II}$ are known.

This formula shows that a high degree of accuracy of measurement for $S_I$, $S_{II}$ and $\Delta S_{II}$ is not absolutely necessary, since the result $\Delta S_I$ represents the difference and not the absolute value of the outlet cross section, and since the absolute values of $S_I$ and $S_{II}$ are only present in their ratio.

It will also be seen that the method is independent of the density of the fluid and also of the speed of flow and thus also independent of the variations in this speed, which are necessarily bound up with the speed of rotation of the motor which drives the blower (fluctuations which are themselves dependent on the variation in voltage or frequency of the electric supply system).

It will be noted that the accuracy is increased by reason of the fact that only a single zero instrument of high sensitivity is employed.

Finally, as the method would however remain sensitive to non-symmetrical variations of the flow in a radial direction on the upstream side of $a$ and $b$, it will be an advantage, in accordance with the invention:

(1) To preferably employ an axial blower of the multi-blade type on the upstream or the downstream side of the arrangement described.

(2) To avoid the use of long diffusers on the downstream side of the blower, these being often the cause of such variations and to make as uniform as possible the distribution of the flow of fluid, by arranging wire netting, metallic gauze and flow correctors on the upstream side of the resistances $a$ and $b$.

Finally, on the downstream side of I and II, the fluctuations of pressure should be prevented and the fluid should be suitably guided.

FIG. 2 shows a more detailed and slightly different form of embodiment of a device in accordance with the invention. The blower comprises a rotor 8 with a plurality of blades 10 carried by a streamlined body 9. The air flows through a conduit 7 having a circular cross section and solid walls 2. The flow is made more uniform and better directed by means of metallic gauze 11 and the correctors 12, constituted by partitions parallel to the axis of flow and forming a kind of checker design. There is shown at 3 the central wall and at $a$ and $b$ the perforated sheets forming resistances of equal drag.

The difference between the total pressures obtaining in A and B is shown by the very sensitive zero-scale pressure gauge 6.

It should be noted that the two piping systems 13 and 14 of the pressure measurement system, shown on FIGS. 1 and 2 as being of unequal length, should in actual fact, be of the same length as shown in FIG. 2a, the volumes of air in the measuring instrument 6 being also equal in order that the equivalent fluctuations of pressure which are simultaneously produced at A and B do not have any effect on the instrument. At the extremities of the half-channels A and B are located admission nozzles 17, on which are mounted the two pieces to be compared 18 and 19 (such as the distributor wheels of turbines for example).

In the device of FIGS. 2 and 2a, the piece 19 (which in this case replaces the exhaust nozzle II of FIG. 1) is not variable, and the air outlet takes places not only through the distributor wheels 18 and 19, but also through two relatively small and variable lateral discharge nozzles 15 and 16 (FIGS. 2a and 2b) of which one, 16, is provided with a graduated scale.

In order to use this device, a distributor wheel, the supposed cross section of which is exactly known, is first of all mounted at 18 to serve as a standard. By varying the opening of the discharge nozzle 16, if necessary also the discharge nozzle 15, the pressure gauge 6 is then brought back to zero. Without changing the piece 15 and the opening of the discharge nozzle 16, the distributor wheel 18 is then replaced by the distributor wheel to be checked. If the latter wheel has a difference in cross section with respect to the standard wheel 18, the needle of the pressure gauge moves away from zero and the opening of the discharge nozzle 16 is then varied so as to bring the pressure gauge back again to zero, the variation of the opening 16 giving, as above, a measure of the error in the wheel checked.

If the discharge nozzle 16 is rectangular, as in the case of FIG. 2b, the regulation of the cross section is effected by lateral movement of the part 20, the displacements of which are directly registered in percentages or in sq. cm. on a graduated scale 21, by a pointer 22. If the cross section of the outlet of the discharge nozzle 16 is circular, the regulation is preferably effected by introducing into the flow of fluid a body which reduces the cross section of flow.

In order to show up any faulty operation of the sensitive pressure gauge 6, such that this gauge indicates zero in spite of a small difference in pressure between A and B, a three-way valve 25 is arranged on one of the connections to the pressure gauge. In order to show an error of zero, it is merely necessary to place this valve in the position shown in FIG. 3a, so that, the two sides of the pressure gauge being then subjected strictly to the same pressure, the needle gives the position of the real zero, and thus shows the correction to be made. The very sensitive pressure gauge 6 (of the torsion type, for example) may in addition be protected against a possible overload during the course of the preliminary balancing operations, by means of the valve 23, which enables the pressure gauge to be short-circuited.

Finally, FIG. 4 shows a further alternative form of the installation in accordance with the invention, which is quite specially adapted to the verification of the outlet cross section of the distributor wheels.

Instead of two half-channels, the installation comprises two circular concentric channels, one of which is adapted to receive first a reference member and then the member to be checked. The distributor wheel 26 to be checked has, in fact, always an internal diameter such that the channel which includes the regulator discharge nozzle II can pass into the interior of this wheel. This assembly has the advantage of having a smaller volume, which results in smaller overall dimensions and more economical construction. In connection with the embodiment of FIGURE 4, of course, there is employed a means for producing an initial homogeneous flow through the main channel, preferably of the same character as the means illustrated in FIGURE 2 and described in connection therewith. Such a means is also employed in the embodiment of FIGURE 1.

In order actually to obtain the minimum accuracy of ±0.2%, which can be obtained with the device in accordance with the invention, it is necessary from time to time to proceed to a new calibration of the system, since account must be taken of the fact that impurities and deformations may result in defects of symmetry.

It will of course be understood that modifications may be made to the forms of embodiment which have been described above, in particular by the substitution of equivalent technical means, without thereby departing from the spirit or from the scope of the present invention.

What I claim is:

1. A measuring bridge for checking the flow areas of nozzles, distributor wheels or the like, comprising a main channel and two branches, means for producing an initial homogeneous flow through said main channel, means for dividing the said flow into two parts and passing each part through one of said two branches, the outlet of one of the said branches being adapted to receive first a reference member and then the member to be checked, means for varying the outlet cross-section of the other of the said branches and means for indicating the difference of total pressure between the two said branches.

2. A measuring bridge in accordance with claim 1 wherein the entries of said branches are provided with means imposing an aerodynamic resistance to the flow, said means comprising a perforated metal sheet arranged transversely to the flow inside each branch.

3. A measuring bridge in accordance with claim 1 wherein the channel supplied by the initial flow is divided by a central wall into two branches having the form of half-channels and terminating respectively in the reference member and the member to be checked.

4. A measuring bridge in accordance with claim 1, wherein the said two branches are constituted by two circular concentric channels.

5. A measuring bridge in accordance with claim 2, wherein said means for producing said initial homogeneous flow comprises metallic gauzes and correctors through which the initial flow passes are disposed on the upstream side of the said means imposing an aerodynamic resistance.

6. A measuring bridge in accordance with claim 4, wherein the annular channel is adapted to receive a member of annular form to be checked.

References Cited in the file of this patent

UNITED STATES PATENTS

| | | |
|---|---|---|
| 1,456,621 | Chadwick | May 29, 1923 |
| 2,266,566 | Poole | Dec. 16, 1941 |
| 2,293,725 | Fiock et al. | Aug. 25, 1942 |
| 2,332,694 | Campbell | Oct. 26, 1943 |
| 2,390,252 | Hayward | Dec. 4, 1945 |
| 2,589,251 | Heinz | Mar. 18, 1952 |
| 2,790,320 | Salko et al. | Apr. 30, 1957 |

FOREIGN PATENTS

| | | |
|---|---|---|
| 388,265 | Great Britain | Feb. 23, 1933 |
| 1,116,948 | France | Feb. 13, 1956 |
| 774,870 | Great Britain | May 15, 1957 |